United States Patent Office 3,063,996
Patented Nov. 13, 1962

3,063,996
SUBSTITUTED PIPERIDINYLALKYL PHENOTHIAZINES
Maxwell Gordon, Elkins Park, Pa., assignor to Smith Kline & French Laboratories, Philadelphia, Pa., a corporation of Pennsylvania
No Drawing. Filed Mar. 2, 1959, Ser. No. 796,260
6 Claims. (Cl. 260—243)

This invention relates to novel substituted piperidinylalkyl phenothiazines having useful pharmacological activity. Specifically, the observed activity of these novel compounds renders them valuable therapeutic agents in man and animals in general as tranquilizers, antiemetics, sedatives, antihistaminics and potentiators of various central nervous system depressants, such as analgetics or anesthetics.

The substituted piperidinylalkyl phenothiazines of this invention are represented by the following fundamental formula:

Formula I

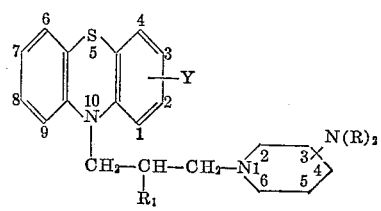

when:
Y represents hydrogen, chlorine, methyl, methoxy, trifluoromethyl, acetyl, methylmercapto, trifluoromethylmercapto, methylsulfonyl, trifluoromethylsulfonyl, or cyano;
R represents methyl or ethyl; and
$R_1$ represents hydrogen or methyl.

The Y moiety is preferably in the 2-position of the phenothiazine ring and the $N(R)_2$ moiety is preferably in the 4-position of the piperidine ring.

Advantageous compounds of this invention are represented by the following fundamental structural formula:

Formula II

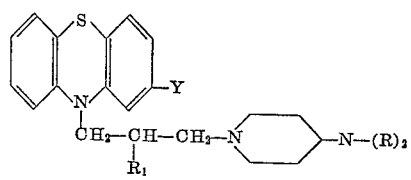

when:
Y represents chlorine, trifluoromethyl, methyl-mercapto, trifluoromethylmercapto, methylsulfonyl, trifluoromethylsulfonyl, or cyano;
R represents methyl or ethyl; and
$R_1$ represents hydrogen or methyl.

Preferred compounds of this invention are represented by Formula II when:
Y represents chlorine;
R represents methyl or ethyl; and
$R_1$ represents hydrogen or methyl.

A particular preferred and advantageous compound is 2 - chloro - 10-[3-(4-dimethylaminopiperidino)-propyl]-phenothiazine.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention are of particular advantage because they possess a second basic center, namely the amino moiety on the piperidinyl ring which helps to make the compounds more water soluble and enables the formation of dibasic acid addition salts.

The novel substituted piperidinylalkyl phenothiazines of this invention are advantageously prepared by several methods. In one method, a phenothiazinyl alkanoyl halide is reacted with a substituted piperidine and the resulting compound is reduced to give the desired product. This method is represented as follows:

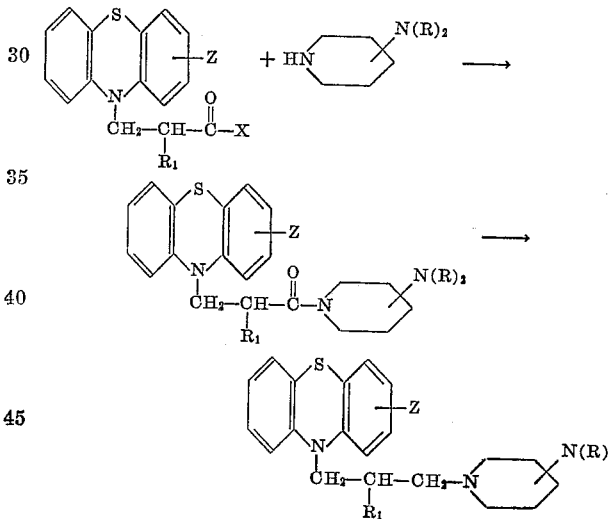

Formula III when:
Z represents hydrogen, chlorine, methyl, methoxy, trifluoromethyl, methylmercapto, trifluoromethylmercapto, methylsulfonyl, or trifluoromethylsulfonyl;
X represents a halogen atom, preferably chlorine; and
R and $R_1$ are as defined above.

The alkylation reaction is run advantageously by refluxing the reactants in a suitable inert aromatic solvent such as benzene, toluene or xylene, for from 6 to 36 hours. The product is isolated by extracting the cool reaction mixture with dilute mineral acid, neutralizing with alkali and extracting the free base with a solvent such as chloroform or ether. Removal of the solvent gives the product usually as an oil which may solidify upon trituration.

The thus formed novel substituted piperidinylalkanoyl phenothiazines represented above by the fundamental structural Formula III are particularly valuable as intermediates in the preparation of the piperidinylalkyl phenothiazines of this invention. As outlined above, the intermediate alkanoyl derivative is reduced to the alkyl derivative by means of a bimetallic metal hydride, such as lithium aluminum hydride or sodium borohydride. In this manner, the alkanoyl derivative is advantageously placed in a Soxhlet extractor which is connected to a stirred suspension of lithium aluminum hydride in anhydrous ether. The reaction mixture is refluxed for from 8 to 24 hours, cooled and the metal complex decomposed by the addition of water and dilute alkali. The precipitate is removed and the dried ether solution is evaporated to give the free base which is converted to the acid addition salts of this invention as outlined above.

It will be noted that the nuclear substituent Z in the above reaction sequence is selected from among those represented by Y in Formula I so as to be unaffected by the reductive conditions employed.

The substituted phenothiazinyl alkanoyl halides used as above are prepared by methods known to the art. For example, the substituted phenothiazine is reacted with an unsaturated nitrile, such as acrylonitrile or methacrylonitrile to give the phenothiazinyl propionitrile which is hydrolyzed with aqueous-methanolic sodium hydroxide to give the phenothiazinyl propionic acid. Alternatively, the nitrile is hydrolyzed with methanolic hydrogen chloride and the resulting methyl ester is hydrolyzed with alkali to yield the free acid. The phenothiazinyl propionic acid is readily converted to the alkanoyl chloride by treatment with phosphorus pentachloride.

The amino substituted piperidines used as above are advantageously prepared by reductive alkylation of an N-benzyl- or N-benzoyl-piperidone with methyl or ethyl amine, followed by alkylation of the monoalkyl derivative with formaldehyde or acetaldehyde, and finally hydrolysis of the N-benzyl or benzoyl group with concentrated hydrochloric acid.

In another method, the substitued piperidinylalkyl phenothiazines of this invention are prepared according to the following reaction sequence:

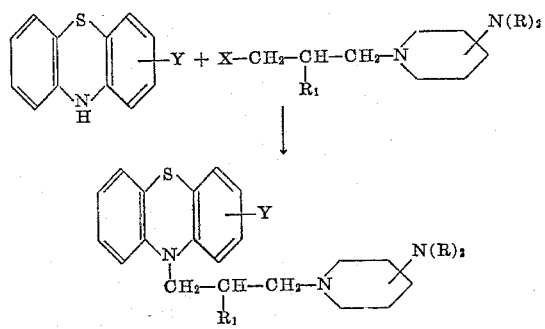

when Y, X, R and $R_1$ are as defined above.

In this method the substitued phenothiazines are alkylated with an ω-haloalkylpiperidine. The alkylation is carried out advantageously by refluxing an ω-haloalkylpiperidine, preferably chloro or bromo, and a substituted phenothiazine in a suitable inert aromatic solvent such as preferably benzene, toluene or xylene, in which at least one of the reactants must be soluble. A suitable acid-binding agent is usually included, such as an alkali metal amide, preferably sodium, potassium or lithium amide. The reaction mixture is refluxed for from 3 to 18 hours and worked up after cooling by adding an excess of water, extracting with dilute hydrochloric acid, neutralizing with base and extracting with benzene. Evaporation of the benzene extracts yields the residual base.

Another synthetic route to the piperidinylalkyl phenothiazines is by means of 10-(ω-ester-alkyl)-phenothiazines which have a reactive end group on the 10-alkyl chain, for example an ω-tosylate or ω-chloro end group, which can be reacted with a substituted piperidine. For example, the ester and piperidine are refluxed in the presence of an acid-binder for a short period and further worked up as described above.

The substituted phenothiazines used as outlined above are prepared following known synthetic methods. Thus, a substituted 2-halo-2'-aminodiphenyl sulfide is cyclized by refluxing in dimethylformamide in the presence of an acid-binding agent, for example sodium or potassium carbonate, and catalytic amounts of copper or copper bronze powder for from 6 to 18 hours. Alternatively, a substituted diphenylamine is heated with sulfur and with or without a solvent in the presence of a catalytic amount of iodine at from 120 to 230° C. for from one to four hours.

The foregoing is a general description of the main synthetic routes in the preparation of substituted piperidinylalkyl phenothiazines. It will be readily apparent to one skilled in the art that variations of these procedures are possible. Of particular advantage as preparative procedures are the methods thoroughly discussed above, namely, reduction of novel substituted piperidinylalkanoyl phenothiazines and alkylation of substituted phenothiazines in the 10-position of the nucleus by an ω-haloalkylpiperidine.

It will be readily apparent to one skilled in the art that certain of the compounds of this invention, notably those in which $R_1$ is represented by methyl so that an asymmetric carbon atom is formed may be present as optical isomers. The connotation of the general formulae presented herein is to include all isomers, particularly the separated d or l optical isomers as well as the dl mixture of these isomers. If desired, the isomers may be separated for individual use by separation methods known to the art, such as fractional crystallization, for instance, of the d-tartrate salts of the substituted piperidinylalkyl phenothiazine derivatives. Alternatively, a synthesis starting with an optically active side chain may yield the desired optical isomer.

The following examples are not limited but are illustrative of compounds of this invention and the procedures for their preparation and will serve to make fully apparent all of the compounds embraced by the general formula given above and the preparation thereof respectively.

EXAMPLE 1

A suspension of 0.23 g. of platinum oxide in 25 ml. of absolute alcohol is shaken over 50 p.s.i. of hydrogen for one hour. To this is added a solution containing 15.5 g. of N-benzoyl-4-piperidone and 3.7 g. of methylamine in 40 ml. of absolute alcohol. The mixture is shaken over 50 p.s.i. of hydrogen for 2.5 hours, when absorption of hydrogen stopped. The alcohol is removed in vacuo and the residue is treated with 25 ml. of dilute hydrochloric acid. The acidic extracts are washed with benzene and then made strongly basic with 40% sodium hydroxide. The free base is extracted with chloroform and the combined extracts are dried over potassium carbonate. The solvent is removed in vacuo to leave a yellow oil, N-benzoyl-4-methylaminopiperidine. A sample of the base is converted to the picrate salt which after two recrystallizations from dimethylformamide-alcohol melted at 204–205° C.

A suspension of 0.25 g. of platinum oxide in 25 ml. of absolute alcohol is shaken over 50 p.s.i. of hydrogen for one hour. To this is added a solution of 13.6 g. of N-benzoyl-4-methylaminopiperidine in 40 ml. of ethanol and 15.4 g. of 37% aqueous formaldehyde. The resulting mixture is shaken over 50 p.s.i. of hydrogen for 5.5 hours. Most of the solvent is removed in vacuo and the residue is taken up in benzene. The benzene solution is extracted with dilute hydrochloric acid; the combined acidic extracts are made basic with 40% sodium hydroxide; and the free base extracted with chloroform. The combined chloroform extracts are dried over potassium carbonate and the solvent removed in vacuo to leave N-benzoyl-4-dimethylaminopiperidine as a pale yellow oil. A sample of this oil is converted to the picrate salt which is recrystallized from dimethylformamide-ethanol to give yellow crystals melting at 206.5–207.5° C.

A mixture of 12.4 g. of N-benzoyl-4-dimethylaminopiperidine and 75 ml. of concentrated hydrochloric acid is refluxed for seven hours during which time a white solid precipitates. The cooled mixture is extracted with ether and made basic with 40% sodium hydroxide. The free base is extracted with chloroform and these combined extracts are dried over potassium carbonate. The solvent is removed in vacuo on the steam bath and the residual amber liquid is distilled at atmospheric pressure to give 4-dimethylaminopiperidine as a colorless liquid, B.P. 182–187° C. A sample of the free base is converted to the picrate salt which after two recrystallizations from water melted at 238–239° C.

A solution of 3.4 g. of 4-dimethylaminopiperidine in 25 ml. of benzene is added dropwise to a stirred suspension of 10.0 g. of β-(2-chloro-10-phenothiazinyl)-propionyl chloride in 25 ml. of benzene. After the addition of an additional 20 ml. of benzene, the reaction mixture is stirred and refluxed for 24 hours. The mixture is extracted with dilute hydrochloric acid and the acidic extracts are washed with benzene. The free base is liberated from the benzene extract with 40% sodium hydroxide and is extracted with chloroform. After drying over potassium carbonate, the solvent is removed in vacuo to leave a brown viscous oil. The oil solidified when triturated with ether and the resulting solid is recrystallized from ethyl acetate to form crystals of 2-chloro-10-[3 - (4 - dimethylaminopiperidinyl) - propionyl] - phenothiazine which melted at 119–120° C.

2 - chloro - 10 - [3 - (4 - dimethylaminopiperidinyl)-propionyl]-phenothiazine (6.4 g.) is placed in a Soxhlet extractor which is connected to a stirred suspension of 1.2 g. of lithium aluminum hydride in 250 ml. of dry ether. The reaction mixture is stirred and refluxed for 14 hours. The cooled mixture is decomposed by successively adding 2 ml. of water, 2 ml. of 10% sodium hydroxide, 6 ml. of water, and then is stirred for one hour. The precipitate is filtered and washed with ether. The combined ethereal solutions are dried over potassium carbonate and the ether removed in vacuo to leave an amber oil, which is 2-chloro-10-[3-(4-dimethylaminopiperidinyl)-propyl]-phenothiazine.

The free base is dissolved in ethanol and a slight excess of ethereal hydrogen chloride is added. The hydrochloride salt precipitated as a white solid which after two recrystallizations from methanol melted at 263–264° C.

EXAMPLE 2

A suspension of 0.3 g. of platinum oxide in 20 ml. of absolute alcohol is shaken over 50 p.s.i. of hydrogen for one hour. A solution of 15.7 g. of N-benzyl-3-piperidone in 25 ml. of absolute alcohol and 5.3 g. of methylamine in 25 ml. of absolute alcohol is prepared and this is added to the activated catalyst. The mixture is shaken over 50 p.s.i. of hydrogen for 1.5 hours. The catalyst is filtered and washed with alcohol. The solvent is removed in vacuo to yield N-benzyl-3-methylaminopiperidine as a colorless liquid boiling at 98–112° C. at 0.1–0.15 mm. The picrate, recrystallized from dimethylformamide-ethanol, melted at 239–240.5° C.

A suspension of 0.3 g. of platinum oxide in 25 ml. of absolute alcohol is shaken over 50 p.s.i. of hydrogen for one hour. A solution of 16.9 g. of N-benzyl-3-methylaminopiperidine in 40 ml. of alcohol and 20.2 g. of 37% aqueous formaldehyde is prepared and added to the activated catalyst. The mixture is shaken over 50 p.s.i. of hydrogen for five hours. The catalyst is removed by filtration and the filtrate evaporated in vacuo. The residue is taken up in benzene and extracted with dilute hydrochloric acid. The acidic extracts are made basic with 40% sodium hydroxide and extracted with chloroform. The dried chloroform extracts are evaporated and the residue is distilled through a Vigreux column to give N-benzyl-3-dimethylaminopiperidine, B.P. 98–102° C./0.03–0.1 mm. A picrate is prepared which melted at 220–221° C. after recrystallization from dimethylformamide-ethanol.

A mixture of 14.5 g. of N-benzyl-3-dimethylominopiperidine in 100 ml. of methanol and 0.5 g. of 10% palladium on charcoal is shaken over 50 p.s.i. of hydrogen at room temperature. Heat is applied and shaking continued for an additional 5.5 hours. The catalyst is filtered and washed with methanol. The solvent is removed at atmospheric pressure and the yellow residual oil distilled through a small Vigreux column to give 3-dimethylaminopiperidine, B.P. 78–83° C./20–25 mm. The picrate salt is prepared and after recrystallization from dimethylformamide-ethanol melted at 243.5–245° C. (dec.).

A solution of 14.6 g. of 3-dimethylaminopiperidine in 60 ml. of dry benzene is added to a stirred suspension of 16.7 g. of β-(2-chloro-10-phenathiazinyl)-propionyl chloride in 30 ml. of dry benzene. The reaction mixture is stirred and refluxed for 24 hours. The cooled mixture is extracted with dilute hydrochloric acid and the acid extracts are washed with ether. The free base is liberated with 40% sodium hydroxide and is extracted with chloroform. After drying over magnesium sulfate, the solvent is removed in vacuo leaving a viscous orange oil. When triturated with ether, the oil solidified and formed pale yellow crystals of 2-chloro-10-[3-(3-dimethylaminopiperidinyl)-propionyl]-phenothiazine.

2 - chloro - 10 - [3 - (3 - dimethylaminopiperidinyl) - propionyl]-phenothiazine (20.0 g.) is placed in a Soxhlet extractor which is connected to stirred suspension of 3.8 g. of lithium aluminum hydride in 500 ml. of dry ether. The reaction mixture is stirred and reflux for 15 hours. The cooled mixture is decomposed by successively adding 3.5 ml. of water, 3.5 ml. of 10% sodium hydroxide and 10.5 ml. of water. After stirring for one hour, the precipitate is filtered and washed well with ether. The combined ethereal solutions are dried over magnesium sulfate and the ether removed in vacuo to leave a pale yellow oil, 2-chloro-10-[3-(3-dimethylaminopiperidinyl)-propyl]-phenothiazine.

The free base is dissolved in ethanol and a slight excess of ethereal hydrogen chloride is added. Upon the addition of ether a white solid precipitated. After recrystallization from methanol-ether, the hydrochloride salt melted at 250.5–251.5° C.

EXAMPLE 3

A mixture of 22.9 g. of 2-methoxyphenothiazine (U.S. Patent 2,785,160), 4.1 g. of sodium amide and 22.4 g. of 3 - chloro - 1 - (3 - dimethylaminopiperidinyl) - propane (prepared by the alkylation of 3-dimethylaminopiperidine with 1-bromo-3-chloropropane) in 300 ml. of toluene is heated at reflux for eight hours. The reaction mixture is cooled, diluted with water and the toluene layer is extracted with dilute hydrochloric acid. The acid extracts are made basic with ammonia and then extracted with benzene. Removal of the benzene in vacuo leaves the residual 10-[3-(3-dimethylaminopiperidinyl)-propyl]-2-methoxyphenothiazine.

Treating the free base with anhydrous hydrogen bromide gas in an ether solution yields the hydrobromide salt.

EXAMPLE 4

A suspension of 0.1 g. of platinum oxide in 20 ml. of absolute alcohol is shaken over 50 p.s.i. of hydrogen for one hour. A solution of 7.5 g. of N-benzoyl-4-piperidone and 2.5 g. of ethylamine in 50 ml. of absolute alcohol is then added. The mixture is shaken over 50 p.s.i. of hydrogen for three hours. The solvent is removed in vacuo and the residue further treated as described in Example 1 to yield N-benzoyl-4-ethylaminopiperidine.

A suspension of 0.1 g. of platinum oxide in 20 ml. of absolute alcohol is shaken over 50 p.s.i. of hydrogen for one hour. A solution of 4.9 g. of N-benzoyl-4-ethylaminopiperidine and 2.8 g. of acetaldehyde in 50 ml. of absolute alcohol is then added. The mixture is shaken over 50 p.s.i. of hydrogen for six hours. The solvent is removed in vacuo and the residue is extracted and treated as in Example 1 to yield N-benzoyl-4-diethylaminopiperidine. The benzoyl group is removed by hydrolysis with concentrated hydrochloric acid as outlined in Example 1 to furnish the 4-diethylaminopiperidine.

A solution of 15.6 g. of 4-diethylaminopiperidine in 100 ml. of benzene is added dropwise to a stirred suspension of 33.2 g. of β-(10-phenothiazinyl)-propionyl chloride in 200 ml. of benzene. The reaction mixture is extracted with dilute hydrochloric acid and further worked up as in Example 1 to give the oily 10-[3-(4-diethylaminopiperidinyl)-propionyl]-phenothiazine.

A Soxhlet extractor containing 4.1 g. of 10-[3-(4-diethylaminopiperidinyl)-propionyl]-phenothiazine is connected to a stirred suspension of 1.1 g. of lithium aluminum hydride in 250 ml. of anhydrous ether. The mixture is stirred and refluxed for 18 hours. The cooled reaction mixture is decomposed by the addition of water and sodium hydroxide as described in Example 1. Removal of the precipitated salts, followed by evaporation of the ethereal solvent yields 10-[3-(4-diethylaminopiperidinyl)-propyl]-phenothiazine.

A solution of the free base is reacted with an excess of maleic acid in an ethyl acetate solution to furnish the maleate salt.

EXAMPLE 5

A mixture of 12.2 g. of 2-methylmercaptophenothiazine (Belgian Patent 552,836), 2.0 g. of sodamide and 12.0 g. of 3-chloro-2-methyl-1-(4-dimethylaminopiperidinyl)-propane (prepared from the reaction of 4-dimethylaminopiperidine and 1-bromo-3-chloro-2-methylpropane) in 250 ml. of toluene is refluxed for eight hours. The reaction mixture is worked up as outlined in Example 3 to give 10-[3-(4-dimethylaminopiperidinyl)-2-methylpropyl]-2-methylmercaptophenothiazine.

The free base is treated with mandelic acid in ethyl acetate solution to give the mandelate salt.

EXAMPLE 6

A suspension of 9.5 g. of β-(2-trifluoromethyl-10-phenothiazinyl)-propionitrile (prepared by reacting 2-trifluoromethylphenothiazine with acrylonitrile as described in Belgian Patent 551,400), 50 ml. of methanol, and 4.5 g. of sodium hydroxide in 15 ml. of water is stirred and refluxed for four hours. The reaction mixture is poured onto 100 ml. of ice-water. Acidification with concentrated hydrochloric acid gave the impure β-(2-trifluoromethyl-10-phenothiazinyl)-propionic acid. The product is purified by digestion with dilute ethanol containing a trace of sodium hydrosulfite.

A suspension of 33.9 g. of the propionic acid derivative prepared above in 250 ml. of dry benzene is cooled to 5° C. To this is added dropwise with stirring a solution of 23.0 g. of phosphorus pentachloride in 150 ml. of benzene. The mixture is stirred for an additional hour and allowed to come to room temperature. Approximately 10–15 g. of sodium hydrosulfite is added and the mixture is filtered. Removal of the solvents from the filtrate in vacuo leaves the residual β-(2-trifluoromethyl-10-phenothiazinyl)-propionyl chloride.

A solution of 12.8 g. of 4-dimethylaminopiperidine in 100 ml. of benzene is added dropwise to a stirred suspension of 36.0 g. of β-(2-trifluoromethyl-10-phenothiazinyl)-propionyl chloride in 250 ml. of benzene. The reaction mixture is stirred and refluxed for 24 hours. Working up as in Example 1 yields 10-[3-(4-dimethylamine - piperidinyl) - propionyl] - 2 - trifluoromethylphenothiazine.

A Soxhlet extractor containing 4.5 g. of 10-[3-(4-dimethylaminopiperidinyl) - propionyl] - 2 - trifluoromethylphenothiazine is connected to a stirred suspension of 0.4 g. of lithium aluminum hydride in 125 ml. of anhydrous ether. The ethereal mixture is stirred and refluxed for 12 hours and worked up as in Example 1 to give the product, 10-[3-(4-dimethylaminopiperidinyl)-propyl]-2-trifluoromethylphenothiazine.

An ethereal solution of the free base is treated with an excess of ethereal hydrogen chloride to give the hydrochloride salt.

Similarly, reacting 2-trifluoromethylphenothiazine with methacrylonitrile and reacting the thus formed α-methylpropionitrile through the sequence of steps described above yields 10-[3-(4-dimethylaminopiperidinyl)-2-methylpropyl]-2-trifluoromethylphenothiazine.

EXAMPLE 7

A suspension of 10.6 g. of 2-methylphenothiazine (U.S. Patent 2,785,160), 2.1 g. of sodium amide and 12.8 g. of 3-chloro-1-(4-diethylaminopiperidinyl)-propane (prepared from the reaction of 3-chloro-1-bromopropane with 4-diethylaminopiperidine) in 300 ml. of toluene is refluxed for ten hours. The cooled reaction mixture is diluted with water and the toluene layer is extracted with dilute hydrochloric acid. The acid extracts are further treated as outlined in Example 3 to give 10-[3-(4-diethylaminopiperidinyl)-propyl]-2-methylphenothiazine.

By reacting the free base in and ether solution with anhydrous hydrogen chloride gas, the hydrochloride salt is obtained.

EXAMPLE 8

A suspension of 8.3 g. of 2-methylsulfonylphenothiazine (Belgian Patent 556,475), 1.2 g. of sodium amide and 7.2 g. of 3-chloro-2-methyl-1-(3-dimethylaminopiperidinyl)-propane (prepared by the reaction of 1-bromo-3-chloro-2-methylpropane with 3-dimethylaminopiperidine) in 250 ml. of toluene is stirred and refluxed for eight hours. Working up the reaction mixture as in Example 3 yields 10-[3-(3-dimethylaminopiperidinyl)-2-methylpropyl]-2-methylsulfonylphenothiazine.

EXAMPLE 9

A suspension of 8.3 g. of 2-trifluoromethylsulfonylphenothiazine (Belgian Patent 568,478), 1.0 g. of sodium amide and 5.6 g. of 3-chloro-1-(4-dimethylaminopiperidinyl)-propane (prepared from the reaction of 1-bromo-3-chloropropane with 4-dimethylaminopiperidine) in 250 ml. of toluene is heated at reflux for eight hours. The cooled reaction mixture is worked up following the procedure of Example 3 to give 10-[3-(4-dimethylaminopiperidinyl) - propyl] - 2 - trifluoromethylsulfonylphenothiazine.

EXAMPLE 10

A suspension of 22.4 g. of 2-cyanophenothiazine (Belgian Patent 552,557), 4.1 g. of sodamide and 25.5 g. of 3-chloro-1-(4-diethylaminopiperidinyl)-propane (prepared from the reaction of 1-bromo-3-chloropropane with 4-diethylaminopiperidine) in 500 ml. of toluene is stirred and refluxed for eight hours. The reaction mixture is cooled, diluted with water and the toluene layer is extracted with dilute hydrochloric acid. The acid extracts are made basic with ammonia, extracted with benzene and evaporated in vacuo to give 2-cyano-10-[3-(4-diethylaminopiperidinyl)-propyl]-phenothiazine.

EXAMPLE 11

To a solution of 142.5 g. of 3-bromophenyl methyl sulfide in 725 ml. of dry chloroform at 10° C., dry chlorine is introduced while the solution is irridated with a 150 watt lamp. The reaction mixture is maintained at 15–18° C. for six and one-half hours. The reaction is stopped and a vigorous stream of nitrogen is introduced. The solvent is removed under reduced pressure and the residue distilled to give a yellow oil, 3-bromophenyl trichloromethyl sulfide, B.P. 102–104° C./1.1 mm.

A mixture of 71.0 g. of 3-bromophenyl trichloromethyl sulfide and 55.0 g. of antimony trifluoride is heated in a distillation flask and the fraction boiling at 190–205° C. is collected. This fraction is dissolved in 800 ml. of ether and washed several times with 6 N hydrochloric acid and then water. The ether solution is dried and the solvent removed under reduced pressure. Distillation at atmospheric pressure yields a colorless liquid, 3-bromophenyl trifluoromethyl sufide, B.P. 192–194° C.

A mixture of 80.0 g. of 3-bromophenyl trifluoromethyl sulfide, 50.0 g. of acetanilide, 26.5 g. of anhydrous potassium carbonate and 1.0 g. of copper-bronze powder is heated in an oil bath at a bath temperature of 220–230° C. for 24 hours. The cooled dark brown viscous mass is extracted with 350 ml. of acetone and the solvent removed under reduced pressure. To the dark brown residue, 90 ml. of concentrated hydrochloric acid in 250 ml. of ethanol is added. The mixture is refluxed for five hours and allowed to stand at room temperature over night. It is then poured into 1.2 liters of cold water and made just alkaline with 20% sodium hydroxide. Extraction with ether and removal of the dried solvent under reduced pressure gives a dark residue which is vacuum distilled to yield a pale yellow oil, 3-trifluoromethylmercaptodiphenyl amine, B.P. 115–119° C./0.3 mm.

A mixture of 58.5 g. of 3-trifluoromethylmercaptodiphenyl amine, 12.5 g. of sulfur and 0.9 g. of iodine is heated in an oil bath at 145–160° C. for one and one-half hours under a stream of nitrogen. The cooled reaction mass is dissolved in 500 ml. of boiling benzene and treated with chromatographic alumina and charcoal. Concentration of the filtrate gives a solid, 2-trifluoromethylmercaptophenothiazine, which recrystallizes from carbon tetrachloride as yellow plates, M.P. 165–166° C.

A mixture of 3.0 g. of 2-trifluoromethylmercaptophenothiazine, 0.4 g. of sodamide and 2.3 g. of 3-chloro-1-(3-dimethylaminopiperidinyl)-propane (prepared by the reaction of 1-bromo-3-chloropropane with 3-dimethylaminopiperidine) in 100 ml. of toluene is stirred and heated at reflux for eight hours. The cooled reaction mixture is then treated as in Example 3 to yield 10-[3-(3-dimethylaminopiperidinyl) - propyl]-2-trifluoromethylmercaptophenothiazine.

What is claimed is:

1. A chemical compound of the class consisting of a free base and its nontoxic pharmaceutically acceptable acid addition salts, said free base having the formula:

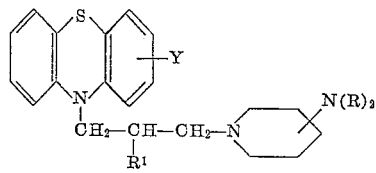

in which Y is a member selected from the group consisting of hydrogen, chlorine, methyl, methoxy, trifluoromethyl, acetyl, methylmercapto, trifluoromethylmercapto, methylsulfonyl, trifluoromethylsulfonyl and cyano; R is a member selected from the group consisting of methyl and ethyl; and $R_1$ is a member selected from the group consisting of hydrogen and methyl.

2. A chemical compound of the formula:

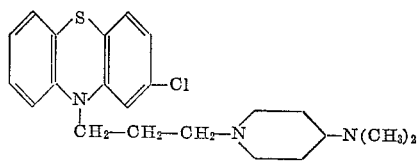

3. A chemical compound of the formula:

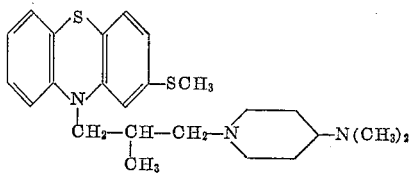

4. A chemical compound of the formula:

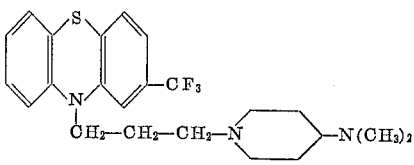

5. A chemical compound of the formula:

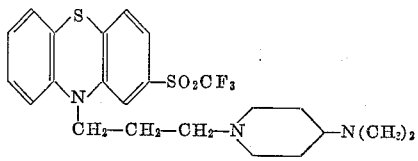

6. A chemical compound of the formula:

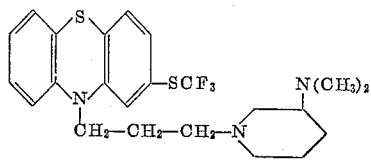

References Cited in the file of this patent

UNITED STATES PATENTS

| | | |
|---|---|---|
| 2,590,125 | Robinson | Mar. 25, 1952 |
| 2,683,715 | Kallischnigg | July 13, 1954 |
| 2,830,987 | Gailliot | Apr. 15, 1958 |
| 2,894,947 | Jacob | July 14, 1959 |
| 2,902,485 | Horclois | Sept. 1, 1959 |

FOREIGN PATENTS

| | | |
|---|---|---|
| 812,911 | Germany | July 8, 1949 |
| 789,703 | Great Britain | Jan. 29, 1958 |
| 91,198 | Norway | Jan. 15, 1958 |
| 560,570 | Belgium | Dec. 30, 1957 |
| 562,299 | Belgium | Feb. 30, 1958 |
| 572,181 | Belgium | Feb. 15, 1959 |

OTHER REFERENCES

Sherlock et al.: 131st meeting of Am. Chem. Soc. (1957).

Fieser et al.: Organic Chemistry (3rd ed.), pages 230 to 232, D. C. Heath and Co., Boston (1958), copyrighted 1956.

Derwent Fine Chemical Patent Journal, vol. 157, Gp. 3A, page 3 (November 10, 1959).

Derwent Fine Chemical Patent Journal, vol. 170, Gp. 3A, page 6 (January 15, 1960).

Derwent Belgian Patent Report, vol. 61 "B", pages C8 to C9, February 15, 1960.